(No Model.)
P. W. CORCORAN.
WEED CUTTER FOR CULTIVATORS.
No. 545,945. Patented Sept. 10, 1895.
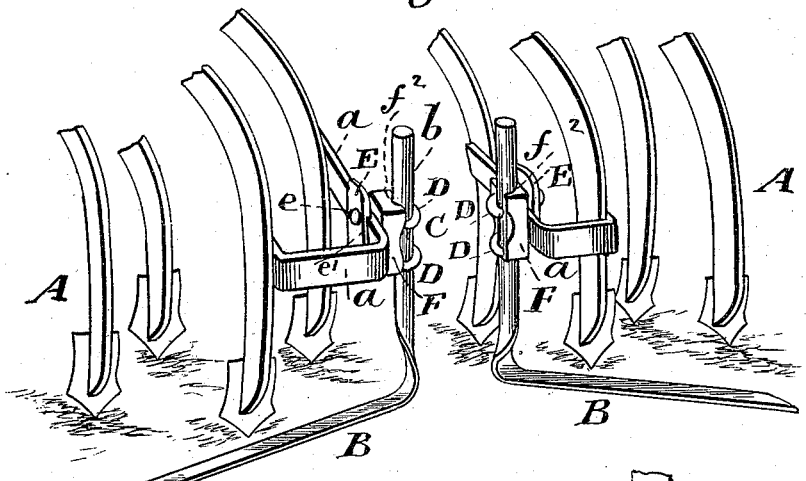
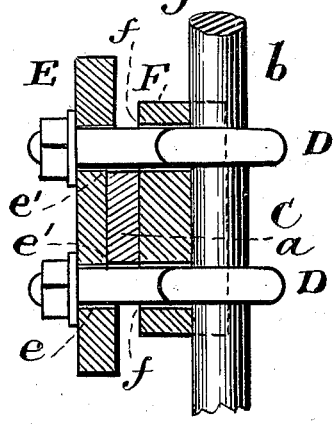
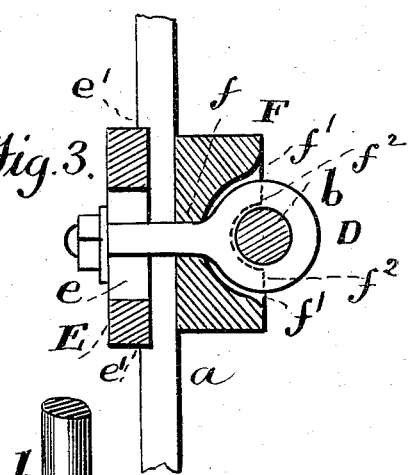
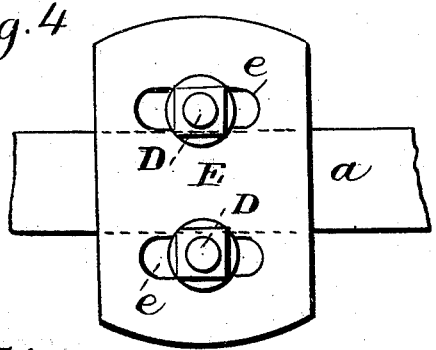
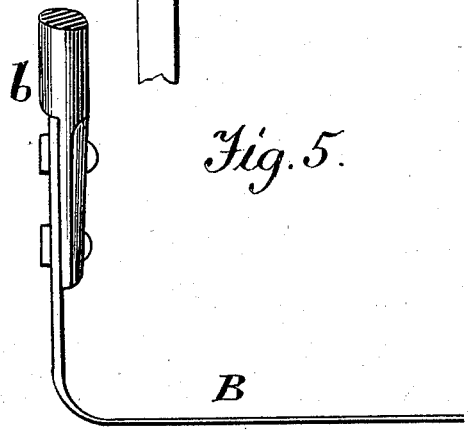
Witnesses.
A. Ruppert.
H. A. Daniels
Inventor.
Patrick W. Corcoran,
Per
Thomas P. Simpson
atty

UNITED STATES PATENT OFFICE.

PATRICK W. CORCORAN, OF SENECA, ILLINOIS.

WEED-CUTTER FOR CULTIVATORS.

SPECIFICATION forming part of Letters Patent No. 545,945, dated September 10, 1895.

Application filed May 25, 1895. Serial No. 550,685. (No model.)

*To all whom it may concern:*

Be it known that I, PATRICK W. CORCORAN, a citizen of the United States, residing at Seneca, in the county of La Salle and State of Illinois, have invented certain new and useful Improvements in Weed-Cutters for Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a cultivator attachment whereby the soil will not only be worked but all the weeds cut up at the same time. The custom is to cultivate between rows of plants and then run a gopher-plow thereafter, so as to cut out the weeds. I perform both operations simultaneously and with one-half the expense.

Figure 1 of the drawings is a perspective view showing my invention applied; Figs. 2, 3, 4, and 5 details showing the form of particular parts, which will be described.

In the drawings, A represents the standards of a cultivator with two sets of shovels, each set running on one side of a straddled row. To the inside standard $a$ of each set I secure the shank $b$ of a cutter B, the former being preferably at any desired angle to the latter. The blade B may be integral with its shank $b$ or connected therewith by two bolts, as clearly shown in Fig. 4 of the drawings.

C is a clamp consisting of the two eyebolts D, having a nut and washer at one end, the metallic plate E cross-slotted at $e\ e$ and cross-grooved at $e'\ e'$, and the metallic plate F, having the holes $f\ f$ and the eye-sockets $f'\ f'$, with the opposite half-circle grooves $f^2\ f^2$ to receive the blade-shank $b$. By this construction the blade B may be adjusted to run in a horizontal plane or to set at any angle thereto, in order to cut the weeds underground in the most effective manner.

Having thus described all that is necessary to a full understanding of my invention, what I claim as new, and desire to protect by Letters Patent, is—

In a weed-cutter the two eyebolts D provided with nuts; the plate E having cross-slots $e\ e$ and cross-grooves $e'\ e'$; and the plate F having holes $f$, sockets $f'$, and half-circle grooves $f^2$; all combined and arranged to form a clamp C as and for the purpose specified.

In testimony whereof I affix my signature in presence of two witnesses.

PATRICK W. CORCORAN.

Witnesses:
T. M. DROMGOLD,
W. J. NUSBAUM.